March 13, 1956

J. R. ALEXANDER 2,738,373

METHOD AND MEANS OF CHARGING AND
OPERATING ELECTRICAL FURNACES

Filed March 22, 1950

JOHN R. ALEXANDER INVENTOR.

BY Elmer P. Rucker
ATTORNEY

JOHN R. ALEXANDER INVENTOR.

BY Elmer P. Rucker
ATTORNEY

JOHN R. ALEXANDER INVENTOR.
BY Elmer P. Rucker
ATTORNEY

March 13, 1956

J. R. ALEXANDER 2,738,373

METHOD AND MEANS OF CHARGING AND
OPERATING ELECTRICAL FURNACES

Filed March 22, 1950

JOHN R. ALEXANDER  INVENTOR.

BY  Elmer P Rucker
ATTORNEY

March 13, 1956

J. R. ALEXANDER 2,738,373

METHOD AND MEANS OF CHARGING AND
OPERATING ELECTRICAL FURNACES

Filed March 22, 1950

JOHN R. ALEXANDER INVENTOR.

BY Elmer P. Rucker

ATTORNEY

2,738,373

METHOD AND MEANS OF CHARGING AND OPERATING ELECTRICAL FURNACES

John R. Alexander, Kirkwood, Mo., assignor to Monsanto Chemical Company, St. Louis, Mo., a corporation of Delaware Application March 22, 1950, Serial No. 151,145

1 Claim. (Cl. 13—33)

This invention is directed to an electric furnace and to a novel method of charging and operating same.

An object of the invention is to provide a novel method and means of charging electrical furnaces whereby substantially uniform distribution of the furnace burden with respect to the electrodes and improved furnace operation are achieved.

Another object of the invention is to provide an improved method and means of charging calcium carbide-, phosphorus-, ferro alloy-, calcium alloy- and aluminum alloy- furnaces whereby irregularities in the operation of said furnaces are either eliminated or substantially reduced in number.

Another object of the invention is to provide a method and means of charging a calcium carbide furnace whereby the formation of conductive crusts including silicon carbide, carbonaceous material and/or eutectic carbide is minimized with the result that substantially improved utilization of heat is obtained.

An additional object is to provide a method and means of charging and operating a calcium carbide furnace whereby a mixed stock and lime interface is maintained in the furnace within the region of temperature suitable for carbide production so that the interface of lime is always at a temperature slightly above that required for the production of eutectic carbide, thus preventing the build up of coke due to the incomplete reaction of lime and coke.

A further object is to provide a method and means of charging and operating a calcium carbide furnace which effect a substantial savings in labor and power costs over those employed by the prior art.

A further object is to provide a method and means of charging and operating a calcium carbide furnace which result in the production of calcium carbide of from 80% to 89% purity.

A still further object is to provide a method and means of charging and operating a calcium carbide furnace whereby substantially increased production rates are obtained over those of the prior art.

Other objects will become apparent to those skilled in the art as the description of the invention proceeds.

Heretofore, numerous irregularities in the operation of a calcium carbide furnace have been encountered, all of which are attributable to the composition of the mixed stock and/or the disposition of its components with respect to each other and the electrodes.

For example, during charging of the calcium carbide furnace, segregation of the components of the mixed stock occurs due to the differences in particle size and specific gravity of the raw materials. This segregation results in a burden of heterogeneous composition and leads to a number of irregularities such as variations in the conductivity of the charge, local displacements of current, short circuits, impaired energy consumption, irregular chemical reactivity of charge components and irregular removal of gas.

Moreover, the foregoing irregularities are emphasized and increased by the conventional practice of charging the entire furnace with mixed stock which corresponds to the desired grade of carbide. This fact will become more apparent from the following description of conventional furnace operation.

In the operation of a conventional calcium carbide furnace, the applied current produces a region of very intense heat which encompasses a very small zone at the very tip of the electrode. In this zone, the temperature is of such magnitude that calcium carbide cannot exist in combined form.

Just outside of the above zone, a somewhat cooler zone exists wherein calcium can combine with carbon to form calcium carbide. This zone is quite hot and easily melts the foregoing product.

A third somewhat cooler zone lies outside of the above calcium carbide forming zone. This zone is still sufficiently hot to produce calcium carbide of about the desired commercial purity of 80%. The carbide in this zone melts and runs down into the lower part of the furnace.

Up to this point, the temperatures of the preceding zones are sufficiently high to yield a carbide of the desired purity or higher. Thus, if 0.6 pound of coke is introduced with each pound of lime all of the lime will react with all of the coke to produce molten carbide which collects in the bottom of the furnace.

The next zone is colder but is sufficiently hot to form low grade carbide. For example, if it is assumed that the zone has a temperature of 1750° C., then eutectic carbide will be formed, consuming only 0.510 pound of coke per pound of lime and leaving behind 0.090 pound of coke.

The zone outside of the low grade carbide zone is too cool to form calcium carbide and hence is a dead or stagnant zone.

During the early stages of the operation of the furnace, reaction takes place between the coke and lime in all zones except the stagnant zone and the by-product gases pass up through a considerable volume of stock. These hot gases heat the cool stock and regenerate heat and the entire volume of stock sinks gently as the reaction continues.

After a short time, an excess of coke accumulates in the low grade carbide zone as it is too cool to effect complete reaction between the lime and coke. This leads to a gradual building up of coke against the stagnant zone.

Certain vaporized and/or solid impurities react with the coke to form hard crusts and eventually the entire low grade carbide zone is built up into a crust of coke and impurities. A similar crust forms around the other electrodes. These crusts conduct electricity more readily than loose stock and current begins to flow through the crusts causing an overload. In response to this condition, the load control raises the electrode to reduce the current flow and in extreme cases the electrode is raised completely out of the crucible with the result that most of the heat is dissipated in the atmosphere. Moreover, on occasions, the crusts have such harmful effects that the furnace must be shut down, cooled off and the crusts removed.

From the foregoing discussion, it can be readily seen that the net effect of the above irregularities in furnace operation is that the quality of the carbide product is impaired and its production rate needlessly reduced. In addition, it is evident that the above irregularities result in excessive labor and power costs.

I have developed an economically and commercially practical method and means of charging and operating a calcium carbide furnace whereby the above irregularities are either overcome or reduced to a minimum. In accordance therewith, a mixture of lime and coke or other suitable form of carbon is charged into the furnace around the electrodes and thereafter or simultaneously therewith lime is introduced around the above mixture. The furnace charge is then electrically heated to produce molten calcium carbide and molten iron alloys which are tapped out of the furnace in the customary manner. There is also produced a gaseous product including carbon monoxide, which may be exhausted into the atmosphere or purified by conventional means to render same suitable for use as a fuel and in various chemical processes.

In charging the furnace, the lime-coke mixture is fed intermittently or continuously to a rotating device hereinafter described which uniformly distributes the charge around the electrode and lime around the charge. The feeding of the above materials during the carbide producing operation is desirably carried out at such a rate that the charge is maintained at the predetermined levels hereinafter described. Moreover, in order to avoid or minimize excessive electrode consumption by reaction with lime, it is desirable to correlate the mixed stock and lime feeds so that the former provides a barrier preventing direct contact of lime with the electrodes.

The weight ratio of total coke to total lime charged to the furnace in the production of calcium carbide varies with the grade of carbide to be produced and the purity of the raw materials. Thus, the higher the grade of carbide the greater is the quantity of coke required for each pound of lime. Moreover, where the raw materials contain many impurities, the charge requires increased amounts of coke to produce carbide of a selected grade since the impurities react with the carbon and thereby reduce the amount of this material available for reaction with lime to produce calcium carbide. Suitable ratios of coke to lime are in the order of 610 lbs. of coke per 1000 lbs. of lime, but they may be as low as 590 lbs. of coke to 1000 lbs. of lime and as high as 650 lbs. of coke to 1000 lbs. of lime.

The weight ratio of coke to lime in the mixed stock also varies with furnace conditions, raw material impurity and grade of carbide to be produced. Suitable ratios are of the order of 640 lbs. of coke per 1000 lbs. of lime with extra lime being charged around the mixed stock to bring the above ratio down to about 600 lbs. of coke per 1000 lbs. of lime. The coke-lime ratios in the mixed stock may be varied in the range of 610 lbs. to 800 lbs. of coke per 1000 lbs. of lime to take care of impurities in the raw materials. As the ratio is increased in the above range, the extra lime charged around the mixed stock is increased so as to bring the total ratio down to 590 lbs. to 650 lbs. of coke per 1000 lbs. of lime.

For a more complete understanding of the present invention reference is made to the accompanying drawings.

The following description of the electric furnace illustrated in Figures 1–5 will be directed primarily to the structure and operation of the furnace in the region of one of the electrodes since it will be identical for the others.

Figure 1:
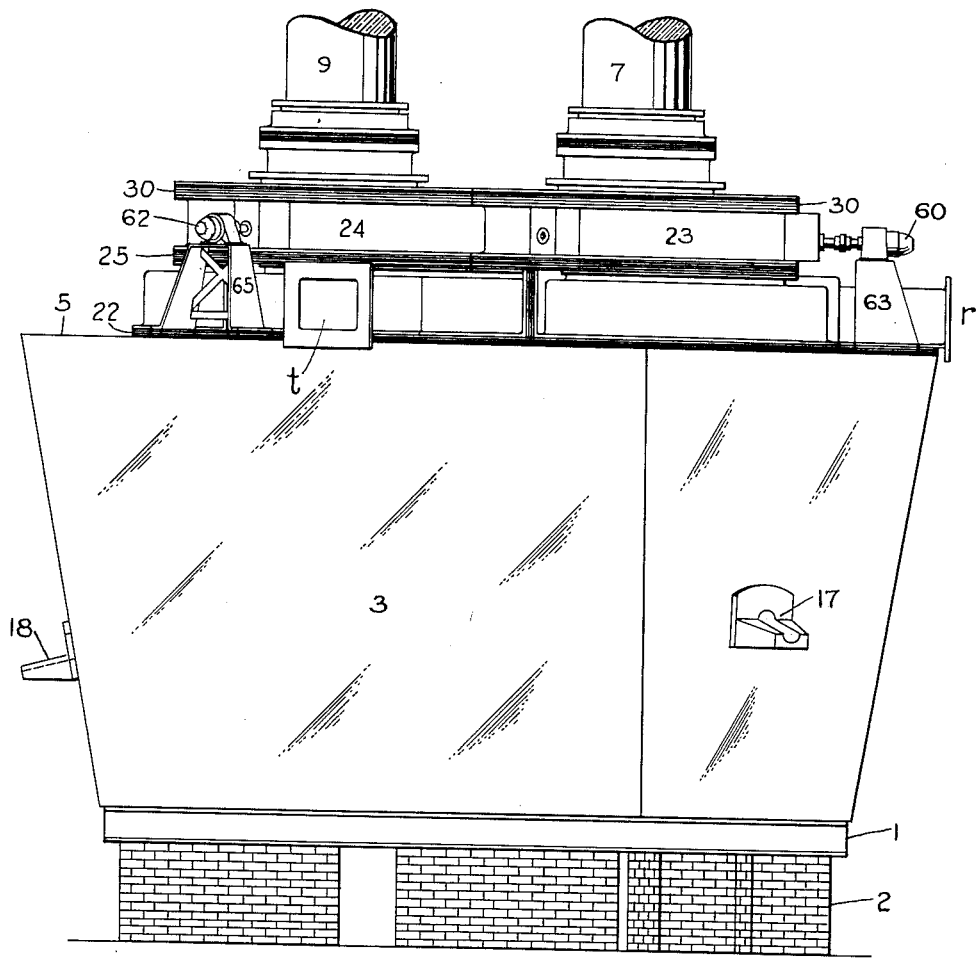
Figure 1 is a side elevational view of an electric furnace showing the electrodes, the gas collection channel, the drive shafts for the rotary feeders, the motors for actuating the drive shafts, the motor supports and the tap holes for calcium carbide and molten metal respectively.
Figure 2:
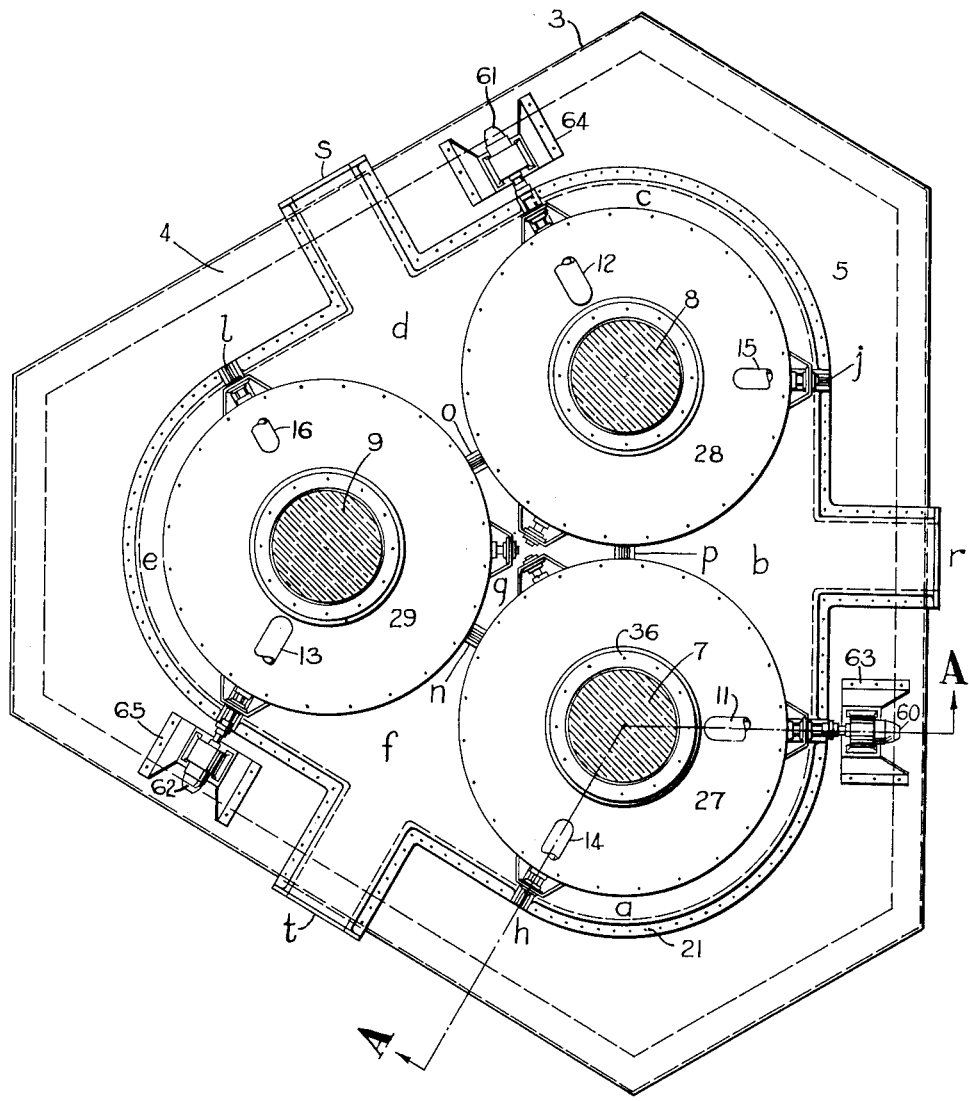
Figure 2 is a top plan view of the above furnace, showing the gas collection channel, the drive shafts for the rotary feeders, the motors for actuating the drive shafts, the idling shafts, the supports for the above shafts and the mixed stock and lime feed lines.
Figure 3:
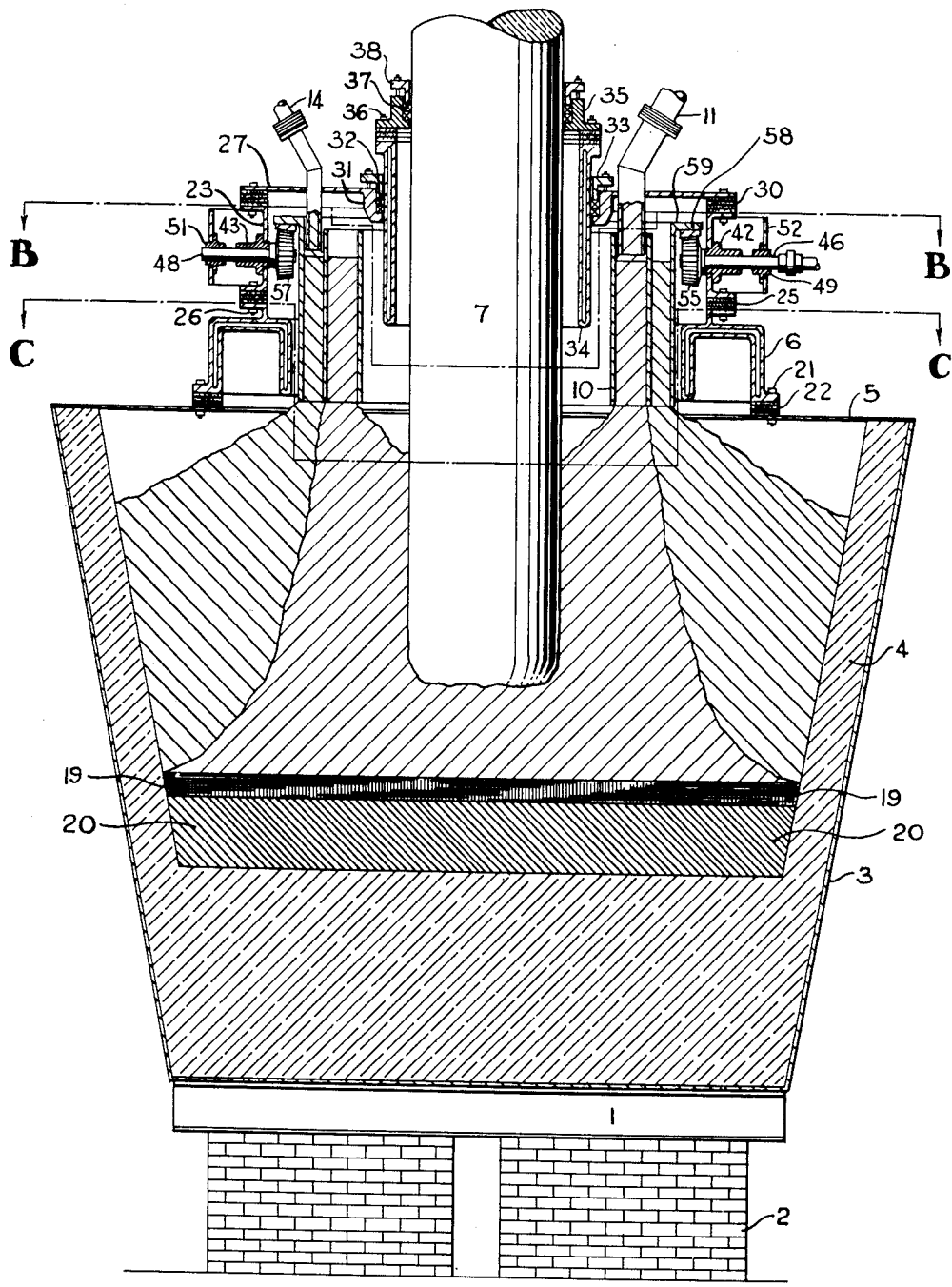
Figure 3 is a vertical sectional view taken on line A—A of Figure 2, showing in detail the structure of the electrode seal, the mixed stock and lime feed lines, the rotary feeder, the drive for the feeder and the stock distribution in the furnace.

As indicated in Figure 1, the furnace is supported by an I-beam grille 1 which is mounted upon brickwork or another suitable support 2. The furnace includes a steel shell 3, a ceramic lining 4 for the bottom and side walls, a cover 5 (Figures 1–3), a water-cooled gas collection chamber 6 (Figure 3), electrodes 7, 8 and 9, a rotary stock feeder 10 for each of said electrodes, mixed stock feed lines 11, 12 and 13, lime feed lines 14, 15 and 16 (Figures 2, 3 and 4) and tap holes 17 and 18 (Figure 1) for respectively discharging calcium carbide 19 and molten metal 20 from the furnace (Figure 3).

The water-cooled gas collection channel 6 performs the function of collecting and conveying the gaseous reaction products out of the furnace. It is composed of intercommunicating channel sections $a$, $b$, $c$, $d$, $e$, $f$ and $g$ which are secured together and insulated from each other by suitable insulating means $h$, $i$, $j$, $k$, $l$, $m$, $n$, $o$ and $p$. Three of these sections, namely, $b$, $d$ and $f$, open into the atmosphere via ports $r$, $s$ and $t$ respectively. All of the sections are flanged at their lower edges and thereby secured to the cover 5 of the furnace through the use of bolts and nuts 21, said flanges being insulated from the cover and rendered gas tight by suitable insulating means 22 (Figures 1 and 3).

The top of the water-cooled gas collection channel around electrodes 7, 8 and 9 (Figure 5) is provided with flanged elements $u$, $v$, $w$ and $x'$ which support the cylindrical members 23 and 24 surrounding electrodes 7 and 9 (Figure 1) and also the cylindrical member (not shown) surrounding electrode 8. The above cylindrical members are provided with flanges at their upper and lower edges (Figure 3), the lower flanges being insulated from elements $u$, $v$, $w$ and $x'$ by insulating means 25 and being secured to said elements in a gas-tight manner by bolts and nuts 26.

The flanged cylindrical members carry cover plates 27, 28 and 29 respectively (Figure 2), these plates being bolted to the upper flanges of the cylindrical members and separated therefrom by suitable insulation 30. (Figures 1 and 3.) These cover plates are provided at their inner edges with a built-in stuffing box 31 (Figure 3) which, in combination with packing 32 and packing gland 33, forms a gas-tight sliding seal with water-cooled packing cylinder 34.

The packing cylinder 34, which moves up and down with the electrode, is insulated from and secured to stuffing box 35 by bolts or other suitable means 36. (Figures 2 and 3.) This stuffing box in conjunction with packing 37 and packing gland 38 provides a gas-tight seal with electrode 7.

Figure 4:
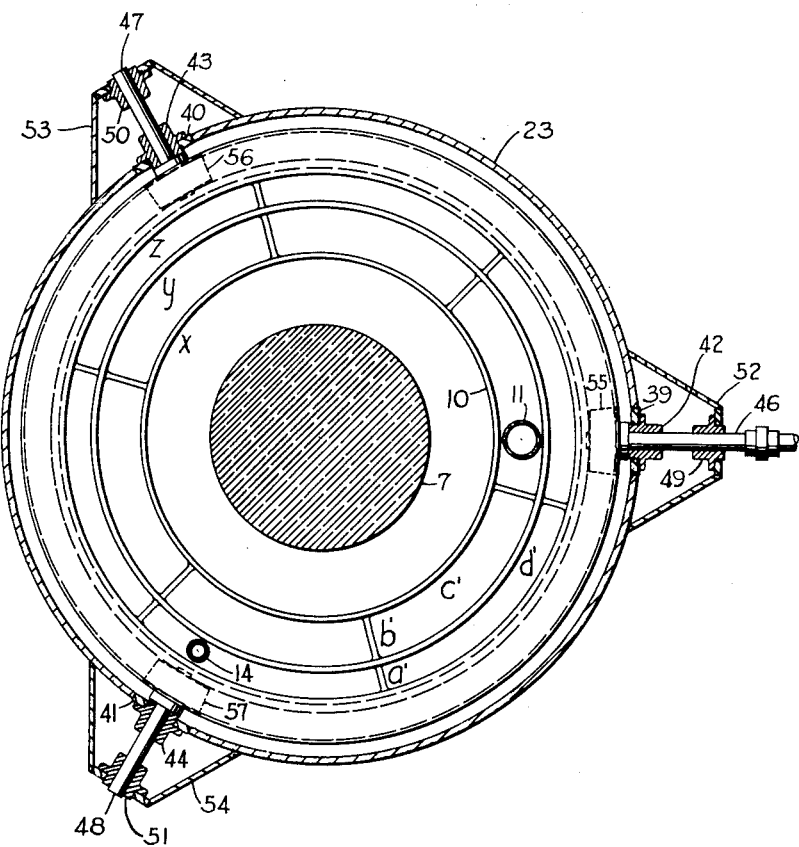
Figure 4 is a horizontal sectional view taken on line B—B of Figure 3, illustrating the mixed stock and lime feed lines, the rotary feeder, the drive shaft for the rotary feeder and the associated idling shafts and the supports for the above shafts.
Figure 5:
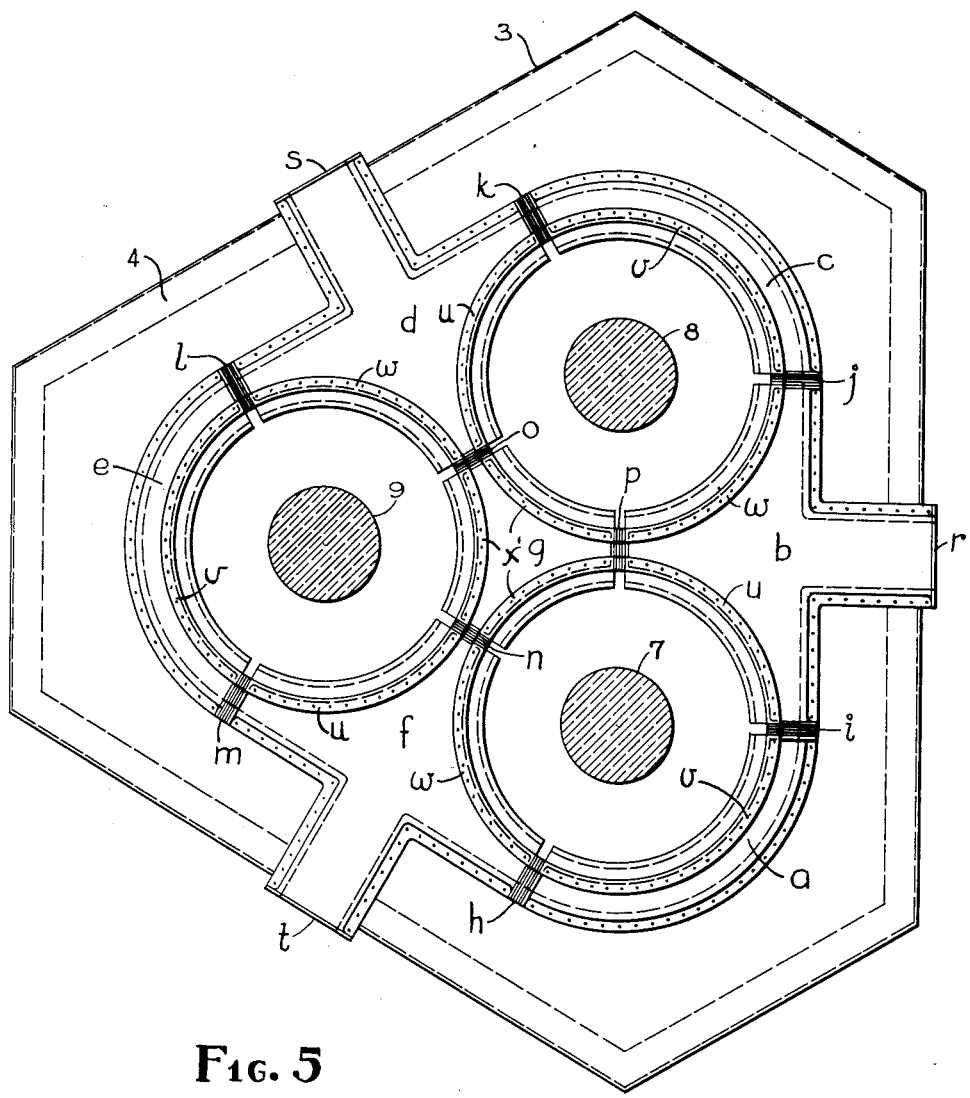
Figure 5 is a horizontal sectional view taken on line C—C of Figure 3, illustrating the structure and arrangement of the gas collection chamber.

The wall of the cylindrical member 23 has sections thereof removed and replaced by heavy flat plates 39, 40 and 41 respectively. (Figure 4.) These plates carry bearings 42, 43 and 44 in which drive shaft 46 and idling shafts 47 and 48 are respectively mounted. These shafts are also mounted in bearings 49, 50 and 51 and the latter in turn are carried by supports 52, 53 and 54, respectively.

The drive shaft 46 and the idling shafts 47 and 48 are respectively equipped with pinion gears 55, 56 and 57 (Figures 3 and 4) which mesh with ring gear 58, the latter being secured to the lower surface of flanged upper edge 59 of the rotary stock feeder 10.

The rotary stock feeder 10 (Figures 3 and 4) is composed of three concentric cylinders $x$, $y$ and $z$, spaced apart and joined together by plates $a'$ and $b'$ which divide the space between the cylinders into compartments $c'$ and $d'$ throughout their circumference. The outer cylinder $z$ is provided at its top edge with a flange 59 which, as pointed out above, carries the ring gear 58 and the plates $a'$ and $b'$ extend from the bottom of the cylinders up to a point just below the ends of the mixed stock feed line 11 and the lime feed line 14.

The rotary feeders surrounding electrodes 7, 8 and 9 are operated by electric motors 60, 61 and 62 (Figures 1 and 2) which are mounted on supports 63, 64 and 65, respectively.

The energization of the above motors results in the actuation of the pinion gears carried by their respective drive shafts. These gears mesh with the ring gears carried by the rotary stock feeders, as more specifically described in connection with Figure 3, and cause the latter to rotate and as the mixed stock and lime are introduced into their respective sections of the rotating feeders, the separator or baffle plates function to uniformly distribute the stock around the electrode and lime around the mixed stock.

In the practice of the invention in the above-described furnace, the rotary stock feeders are set into motion and then the lime-coke mixture and lime are fed to the furnace. As these materials enter the rotating feeders, they are contacted by the baffles or separator plates and uniformly distributed in the furnace, the lime-coke mixture being charged around the electrodes and the lime around the lime-coke mixture as indicated in Figure 3.

Upon filling the furnace up to the level indicated in Figure 3, the mixture of lime and coke is electrically heated to convert same into molten carbide and metal which are then tapped out of the furnace intermittently or continuously as desired. As these materials are tapped from the furnace, equivalent amounts of raw materials are intermittently or continuously charged to the furnace so as to maintain the level of the feed at the points shown in the above figure or at least above the bottom end of the rotary feeder. This method of charging is not absolutely essential, but is highly desirable since it eliminates any tendency for the relatively pure lime to come into contact with the electrodes and thereby cause excessive electrode consumption.

While the above described method and means of charging the furnace is the preferred one, it should be clearly understood that the invention is by no means limited thereto as other rotary means of effecting uniform distribution of the above charge around the electrodes may be employed.

For example, it is within the scope of the invention to eliminate the baffles in the rotary feeder, support the component cylinders in any suitable manner and then merely use them as fixed chutes for charging mixed stock and lime around the electrodes. In such an arrangement, there is provided a set of guides or open-bottom troughs encircling the electrodes and registering with the mixed stock and lime chutes so that the material fed into the guides or troughs is distributed uniformly around the electrodes. As a means of achieving this objective, a chain conveyor with drag plates or flights of the Redler type is mounted within the above guides or troughs.

In operating such a system, the raw materials are introduced until the furnace and the mixed stock and lime chutes are filled whereupon additional amounts are charged in order to fill the troughs or the space between the guides. After this has been accomplished, the charging is discontinued and the furnace put into operation to form calcium carbide. As soon as a portion of the lime and coke react to form calcium carbide in the furnace, the raw materials flow by gravity into the furnace to take the place of the void thereby created. This gradually lowers the level of the charge in the troughs until it falls to a point just below the bottom thereof, in which case suitable automatic controls initiate feeding of the raw materials to one or both troughs as the situation requires. In addition, the controls also start up the movement of the conveyors which effect uniform distribution of the raw materials throughout the circumference of their respective chutes. The charging of the troughs continues until they are filled as above described whereupon the charging and operation of the conveyors are discontinued until the level of the raw materials drops to the above indicated point. However, if desired, only the charging need be interrupted as the operation of the conveyors may be continued even after the troughs are filled. Moreover, instead of operating the controls only when the levels of the raw materials fall to a point just below the bottom of the troughs, the controls may be adjusted to operate when the levels of either the mixed stock or lime or both fall to any point above the bottom of their respective chutes.

In place of a conveyor of the Redler type, there may be substituted a rotary feeder consisting of three concentric cylinders, spaced apart and joined together by separator plates which divide the channels between the cylinders into compartments throughout their circumference. The channels into which the raw materials are charged register with corresponding channels in the above described stationary mixed stock and lime chutes so that as the feeder is rotated the baffles or separator plates strike the feed and distribute it evenly in the chutes surrounding the electrodes.

The practice of the invention using the arrangement described in the preceding paragraph is identical with the system using the Redler conveyor except that the controls are adapted to a single rotary feeder instead of separate chain conveyors for the mixed stock and lime.

As a further modification, it is also within the scope of the invention to use rotary conduits which are located above but preferably partially extend into the mixed stock and lime chutes described above. These conduits rotate continuously or intermittently around the axis of the electrodes and thereby uniformly distribute the charge around same.

The feeding of the raw materials to the rotary conduits is automatically controlled by a suitable means which initiates the feed when the level of the charge drops to a point just above the bottom of its respective chute or some other predetermined point therein, and interrupts the feed when the level of the charge reaches the top of the chute or some selected point between it and the bottom thereof.

Where it is desired to merely introduce mixed stock without additional lime around the outside of the charge, it is obvious that this may be accomplished in accordance with the present invention by using the above described apparatus and merely charging mixed stock around the electrodes. However, since in this type of operation the means for charging lime separately is superfluous from the standpoint of apparatus, it is within the broader aspects of the invention to modify the furnace still further.

For example, the rotary feeder 10 illustrated in Figure 4 may be modified by omitting the intermediate cylinder y and making the baffles a' and b' integral with each other. This obviates the necessity of having lime feed 14 which is, therefore, eliminated. The method of operation is otherwise identical with that described in connection with the above figure except that the additional benefits derived from the use of lime around the mixed stock are lost.

In the case of the second embodiment of the invention described above, it may be further modified by eliminating the lime feed line, the Redler conveyor for the lime and the lime feed chute. The last mentioned objective is preferably achieved by modifying the rotary feeder 10 as described in the preceding paragraph and mounting it in a fixed position so that it merely serves as a stationary chute for the mixed stock.

The third embodiment of the invention may be modified by converting the rotary feeder into a feeder for mixed stock only. This is done by eliminating the intermediate cylinder and uniting the inner and outer cylinders in the manner described above. To adapt the apparatus to this change, the lime feed line is removed and the multiple chute for the mixed stock and lime is converted into a single chute for the former.

The fourth embodiment of the invention may be modified by eliminating the rotary conduit for feeding the lime and also the lime chute. The latter is preferably accomplished in the manner described in connection with the second embodiment of the invention.

The foregoing description has been directed primarily to closed electrical furnaces, particularly to closed calcium carbide furnaces, and to methods and means of charging same. However, the invention is not restricted to the above field as the improvements herein-described are equally applicable to electrical furnaces (open or closed) which are used in smelting mixtures of materials of varying particle size and specific gravity such as conventional mixtures employed in producing fused alumina, elemental phosphorus, ferrosilicon, ferrophosphorus, ferro aluminum silicon, ferro manganese, calcium silicon, calcium aluminum silicon and similar products.

In the production of aluminum oxide abrasives, phosphorus, etc., the furnace illustrated in Figures 1-5 and the various modifications herein-described may be employed, but for obvious reasons, it is desirable in the above operations to use those embodiments of the invention involving the elimination of the lime feed conduits and chutes as no advantages flow from charging lime or other materials around the mixed stock in the manner described in connection with the production of calcium carbide.

The present invention provides a number of advantages over prior electrical furnaces from the standpoint of charging and operating same.

For example, it ensures uniform distribution of mixed stock around the electrodes without the use of the conventional guide vanes and at the same time minimizes segregation of the stock due to variation in particle size and specific gravity of its components. This in turn eliminates or reduces to a minimum the irregularities in furnace operation which accompany the use of a charge of heterogeneous composition.

With reference to calcium carbide, additional advantages flow from the charging of the raw materials in such a manner as to provide lime at the mixed stock interface. For example, by using lime at this point and maintaining the mixed stock and lime interface within the region of temperature suitable for carbide production so that the interface of lime is always at a temperature slightly above that required for eutectic carbide, the formation of conductive crusts due to incomplete reaction of lime and coke is eliminated or minimized with the result that free gas flow, free movement of mixed stock into the hot part of the furnace and efficient utilization of power are achieved. Moreover, the use of lime in the above manner effects a substantial spread in the reaction zone by permitting the production of high grade carbide in the vicinity of the electrode and a low grade carbide at a greater distance from the electrode. In other words, since higher temperatures prevail in the vicinity of the electrodes, the composition may be adjusted to yield a higher quality of the carbide and this results in a substantial spread of the heating zone. Since the reaction zone is thereby enlarged and since the lime at the outer zone lowers the temperature at which low grade carbide can be produced, a more efficient utilization of heat is realized with the ultimate practical result of increasing the yield and quality of the calcium carbide product. Finally, due to the spread of the reaction zone, a more efficient regeneration of heat is obtained since the gaseous reaction product passes up through a wider zone of relatively cool mixed stock.

While I have specifically described the preferred embodiments of my invention, it is to be understood that it is not so limited but may be otherwise embodied and practiced within the scope of the following claim.

I claim:

An electric furnace for the production of calcium carbide comprising, in combination, a closed furnace chamber; an electrode extending vertically downward into the lower part of said chamber; a rotary distributor surrounding said electrode and consisting of three concentric cylinders spaced apart and joined together by radially disposed plates dividing the space between the cylinders into compartments; means for introducing a mixture of lime and carbon between the inner and intermediate cylinders of said distributor and free lime between the intermediate and outer cylinders of said distributor; and means for rotating said distributor.

References Cited in the file of this patent

UNITED STATES PATENTS

| Number | Name | Date |
|---|---|---|
| 863,044 | Petersson | Aug. 13, 1907 |
| 1,496,232 | Klugh | June 3, 1924 |
| 1,680,163 | Mignet | Aug. 7, 1928 |
| 1,719,970 | Eldridge | July 9, 1929 |
| 1,748,780 | Marshall | Feb. 25, 1930 |
| 1,811,021 | Patart et al. | June 23, 1931 |
| 1,979,052 | Ridgway | Oct. 30, 1934 |
| 2,123,158 | Ridgway | July 5, 1938 |
| 2,177,621 | Winter et al. | Oct. 24, 1939 |
| 2,222,585 | Riggs | Nov. 19, 1940 |
| 2,358,024 | Najarian | Sept. 12, 1944 |

FOREIGN PATENTS

| Number | Country | Date |
|---|---|---|
| 108,504 | Sweden | Sept. 21, 1943 |